United States Patent
Balus et al.

(10) Patent No.: US 9,160,626 B2
(45) Date of Patent: Oct. 13, 2015

(54) METHOD AND APPARATUS FOR OBJECT GROUPING AND STATE MODELING FOR APPLICATION INSTANCES

(75) Inventors: Florin Balus, Cupertino, CA (US); Paul Kwok, Sunnyvale, CA (US); Vinod Prabhu, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/346,442

(22) Filed: Jan. 9, 2012

(65) Prior Publication Data

US 2013/0176867 A1 Jul. 11, 2013

(51) Int. Cl.
*H04L 12/26* (2006.01)
*H04L 12/24* (2006.01)
*H04L 12/723* (2013.01)

(52) U.S. Cl.
CPC ........ *H04L 41/0893* (2013.01); *H04L 41/0233* (2013.01); *H04L 43/0817* (2013.01); *H04L 43/0847* (2013.01); *H04L 45/50* (2013.01)

(58) Field of Classification Search
CPC ...................................................... H04L 41/12
USPC ............ 709/223, 224; 370/254, 241.1, 235, 370/230, 217; 707/812, 609; 714/37; 706/47
See application file for complete search history.

(56) References Cited

U.S. PATENT DOCUMENTS

| | | | |
|---|---|---|---|
| 7,028,228 B1* | 4/2006 | Lovy et al. | 714/57 |
| 2002/0022952 A1* | 2/2002 | Zager et al. | 703/22 |
| 2007/0014248 A1* | 1/2007 | Fowlow | 370/254 |
| 2007/0158574 A1* | 7/2007 | Petrillo et al. | 250/370.13 |
| 2007/0185874 A1* | 8/2007 | Tofinetti et al. | 707/9 |
| 2010/0332906 A1* | 12/2010 | Agrawal et al. | 714/37 |
| 2012/0087232 A1* | 4/2012 | Hanabe et al. | 370/217 |

\* cited by examiner

*Primary Examiner* — Andrew Lai
*Assistant Examiner* — Jamaal Henson
(74) *Attorney, Agent, or Firm* — Wall & Tong, LLP

(57) ABSTRACT

Various exemplary embodiments relate to an operational group in a network element of a communication network, where the operational group is associated with monitored objects and monitoring client objects such that the status of the operational group is a function of the operational status of the monitored objects or services. Monitoring client objects can monitor the status of the operational group such that the status of each of the monitoring client objects reflects the status of the operational group.

17 Claims, 2 Drawing Sheets

METHOD AND APPARATUS FOR OBJECT GROUPING AND STATE MODELING FOR APPLICATION INSTANCES

FIELD OF THE INVENTION

The invention is directed to telecommunication systems and more specifically, improved management tools for telecommunications services.

BACKGROUND OF THE INVENTION

Applications may be implemented or instantiated using complex or compound services, endpoints, resources and the like. Unfortunately, coherent management of the various services, endpoints, resources and the like is difficult in present systems.

The various services, endpoints, resources and the like supporting a complex/compound service are presently managed individually by network management systems. That is, application-supportive elements are individually managed from a network-centric perspective by the network management system rather than from an application-centric perspective. This leads to situations where application performance is compromised (or not optimized) due to management decisions addressing problems associated with an individual managed element without regard to the impact of such decisions on application performance, the totality of the managed elements supporting application and so on.

For example, in a communications network where a number of metro area networks (MANs) providing VPLS services over MPLS are interconnected through a wide area network (WAN) also running VPLS, and MPLS Pseudowires (PWs) are used to interconnect the various VPLS instances, current network management techniques control and monitor the individual pseudowires but do not monitor all the collective of pseudowires required to support the VPLS services across the metro area networks.

Therefore, an improved management technique for telecommunications services and objects is highly desirable.

SUMMARY OF THE INVENTION

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments of the present invention define an operational group, the status of which may be derived by monitoring the status of individual components (monitored objects) using certain rules. A number of other service entities (monitoring client objects) may be configured to monitor the operational group status and to perform certain actions as a result of status transitions. For example if the operational group goes down, the monitoring objects will be brought down. The concept allows for monitoring and controlling applications implemented using complex/compound services, endpoints, resources and the like.

Advantageously, various embodiments of the present invention can improve application performance by managing application-related elements as a group rather than as individual elements.

Various exemplary embodiments relate to a hierarchy-free operational group object within a network element, the operational group object comprising: an association with at least one monitored object wherein an operational status of the operational group object is a function of a status parameter of each of the at least one monitored object.

In various alternative embodiments the status parameters are selected from the group comprising: an operational state; a traffic load level; a traffic quality measure; a bit error rate; a quality of service; and a forwarding status.

In various alternative embodiments each monitored object comprises a service selected from the group comprising: a Virtual Leased Line (VLL); a Virtual Private LAN Service (VPLS); a Virtual Private Routed Network (VPRN); and a Circuit Emulation Service.

Various alternative embodiments further comprise an association with one or more monitoring objects, wherein an operational status of each of the one or more monitoring objects is a function of the operational status of the operational group object.

In various alternative embodiments the function is selected from the group of: a threshold of the quantity of monitored objects; a threshold of the quantity of monitored objects having a specific state; and a ratio of the quantity of monitored objects having a specific state relative to the quantity of monitored objects having a different state.

Various alternative exemplary embodiments relate to a method for monitoring a group of network objects. The method comprise steps of: creating an operational group object; associating at least one monitored object with the operational group object, wherein an operational status of the operational group object is a function of a status parameter of each of the at least one monitored object.

In various alternative embodiments the status parameters are selected from the group comprising: an operational state; a traffic load level; a traffic quality measure; a bit error rate; a quality of service; and a forwarding status.

Various alternative embodiments further comprise: associating one or more monitoring objects with the operational group object, wherein an operational status of each of the one or more monitoring objects is a function of the operational status of the operational group object.

Various alternative exemplary embodiments relate to a program storage device readable by a machine, tangibly embodying a program of instructions executable by the machine to perform method steps described above.

BRIEF DESCRIPTION OF THE DRAWINGS

Some embodiments of apparatus and/or methods in accordance with embodiments of the present invention are now described, by way of example only, and with reference to the accompanying drawings in which.

In the figures, like features are denoted by like reference characters.

DETAILED DESCRIPTION

Figure 1:
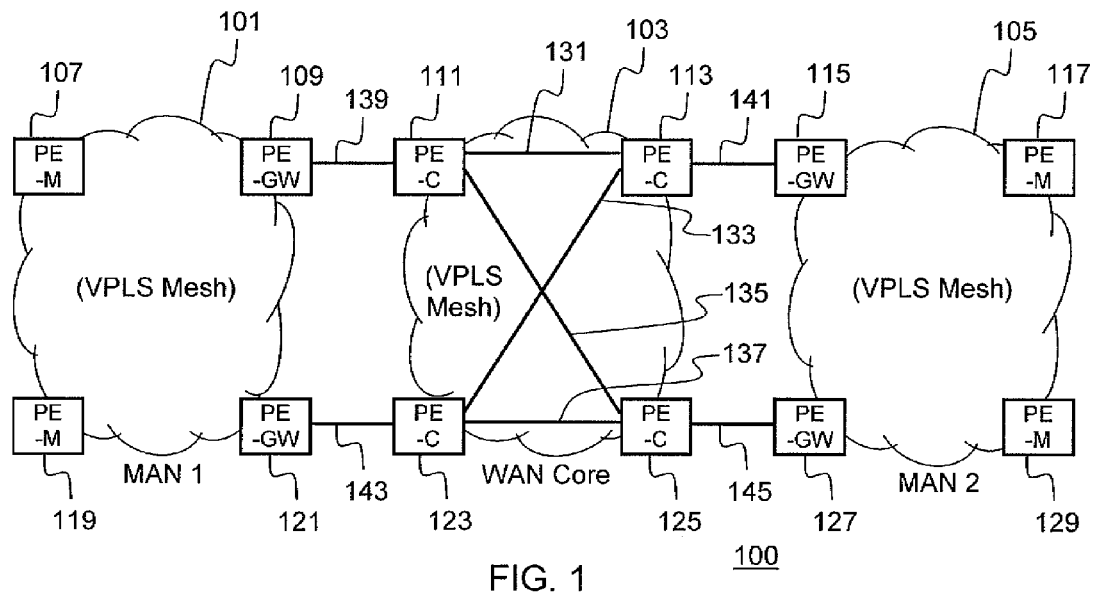
FIG. 1 depicts an exemplary communication system illustrating metro area networks providing VPLS services interconnected through a wide area network using provider edge devices.

FIG. 1 depicts an exemplary communication system illustrating metro area networks (MAN) "MAN1" 101 and "MAN2" 105 providing VPLS services over MPLS interconnected through a wide area network (WAN) "WAN Core" 103, also running VPLS using provider edge devices (PE) 109, 111, 113, 115, 121, 123, 125 and 127. PEs are also referred to generically as network elements or network nodes. In the context of the present document, PEs can be network routers, service routers, multiservice edge routers or the like.

MPLS Pseudowires (PWs) are used to interconnect the VPLS instances running on each PE within each MAN 101, 105 and within WAN Core 103. The VPLS instances on PEs 111,113,123,125 on WAN Core 103 are interconnected with PWs 131, 133, 135,137 in a mesh arrangement. Similarly, VPLS instances on PEs 107, 109, 119, 121 within MAN1 101, and VPLS instances on PEs 115, 117, 127, 129 within MAN2 105 are interconnected with PWs (not shown) in a mesh arrangement. The VPLS instances on gateway PEs 109, 115 of the MAN1 network 101, and VPLS instances on gateway PEs 121, 127 of the MAN2 network 105 are connected via PWs 139, 141, 143, 145 to corresponding VPLS instances on PEs 111, 113, 123, 125 respectively of WAN Core 103. Thus, MAN1 101 is connected to WAN Core 103 with redundant PWs 139, 143 and similarly, MAN2 105 is connected to WAN Core 103 with redundant PWs 141, 145. A redundancy mechanism is usually deployed at the MAN-WAN interface to ensure that only one of the PWs of each redundant pair is active at any point in time while the other is in standby.

For example, for the interconnection between MAN1 101 and WAN Core 103 let us assume that the PW 139 between PE 109 and PE 111 is active and PW 143 between PE 121 and PE 123 is in standby. If the WAN PW Mesh sourced at PE 111 goes down then PE 111 is no longer the appropriate choice for the interconnect to MAN1. In this case, PW 139 should be placed in standby mode and the PW 143 should be activated in order to maintain connectivity between MAN1 101 and WAN Core 103.

Traditionally, the status of the individual PWs 131, 135 on a network node such as PE 111 and the services they support (such as VPLS) would have needed to be monitored individually, complicating management of the interconnections between MAN1 101 and WAN Core 103.

Operationally, embodiments of the present invention define an operational group to associate disparate objects and services. For example, an operational group "wan-pw-mesh" can be configured on PE 111 and associated with the WAN PW mesh sourced on PE 111, that is, PW 131, 135 that make up the PW mesh. In the case of a failure of any of the members (PW 131, 135) of the "wan-pw-mesh" operational group, which would affect the integrity of the PW mesh, the status of the "wan-pw-mesh" operational group will go down. The operational group "wan-pw-mesh" can be associated with PW 139 as a monitoring client or object so that PW 139 monitors the status of operational group "wan-pw-mesh". This monitoring configuration can be configured so that the status of PW 139 goes down when the status of operational group "wan-pw-mesh" goes down. In this manner, objects which affect the performance of a client object, even if they are not directly connected to the client object, can be grouped and monitored as a single entity to facilitate management of the client object.

A similar operational group "wan-pw-mesh" can be configured on PE 123, comprising PW 133, 137, to be monitored by PW 143 as a monitoring client, and on PE 113 to be monitored by PW 141 and on PE 125 to be monitored by PW 145.

Operationally, in this VPLS scenario, the following steps are involved in enabling the block on group failure:

1. Identify a set of objects whose forwarding state should be considered as a whole group;
2. Group these objects under an operational group. (In various embodiments, parameters other that forwarding state can also be monitored);
3. Associate clients or client objects with the operational group as monitoring objects such that the status of the monitoring objects will be derived from the status of the operational group.

Figure 2:
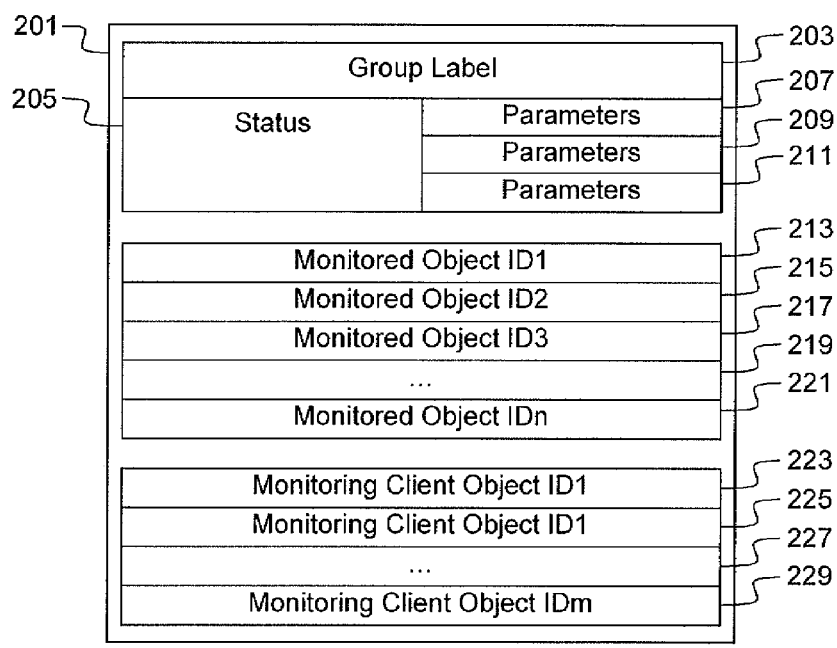
FIG. 2 illustrates a data structure for an operational group according to an embodiment of the present invention.

The structure of embodiments of the present invention will now be described with reference to FIG. 2. Network elements (nodes) such as routers, service routers, switches, etc., in a communication network have services (objects) configured locally. Many of these services can also be managed centrally by a remote network management system as is well-known in the art. An operational group 201 at a network element is identified by operational group label 203. The operational group 201 is configured when the group label 203 is assigned. The status of the operational group 201 is stored at 205 along with parameters 207, 209, 211 which provide rules for determining the status of the operational group. Depending on the type of operational group, the status 205 can default to active or standby. Objects (services, endpoints, resources) to be monitored are associated with the operational group 201 by storing their identifier (monitored object ID) at 213, 215, 217, 219, 221.

The status of the individual objects are monitored and managed by the operating system of the network element as is well known in the art. This monitoring can now be extended to operational groups. Generally the parameters 207, 209, 211 relate to the status of the monitored objects, thus parameter 207 can specify that the status 205 of operational group 201 is defined by a logical OR of the status of the monitored objects, that is, the status of the operational group will by active (up) if at least one of the monitored objects 213, 215, 217, 219, 221 is active. The parameters or rules are then processed by the operating system of the network element to calculate the status of the operational group 201.

In various alternate embodiments, the status 205 of the operational group 201 is determined by the status of one or more monitored objects 213, 215, 217, 219, 221 according various rules defined by parameters 207, 209, 211:

1. The status 205 of operational group 201 can be defined by a logical AND of the status of the monitored objects, that is, the status of the operational group will be active (up) only if all of the monitored objects 213, 215, 217, 219, 221 are active (up).
2. One or more threshold levels are defined, such as a predefined number of objects going down (inactive or standby),
3. One or more threshold levels are defined, such as a predefined percentage of objects going down (inactive or standby).
4. The status of a monitored object in the operational group 201 is considered down (inactive or standby) if it is not forwarding traffic in at least one direction. (Which could be caused by the operational state of the monitored object is down or the direction is blocked through some resiliency mechanisms.)
5. The status of a configured operational group 201 with no monitored objects defaults to active (up). As monitored objects are added to the group, the status of the group is determined by the status of the monitored objects.
6. In the case of Multiple VLAN Registration Protocol (MVRP) applications, the status of a configured operational group with no monitored objects defaults to down (inactive or standby).

7. The status of an operational group is de-bounced using configurable hold-up/hold-down timers (i.e. the detected state is stored only after it has remained stable for a specified time).

Client objects are associated with operational group 201 by storing their respective identifiers (Monitoring Client Object ID) at 223, 225, 227, 229. In this manner, the operating system of the network element is informed that the status of each of the monitoring client objects should now reflect the status of operational group 201.

Advantageously, a service or application implemented using multiple/complex/compound services, endpoints, or resources can easily convey a useful status indication, representative of the status of the underlying services. Embodiments of the present invention can associate disparate objects into an operational group. No hierarchical relationship between monitored objects, operational groups or monitoring client objects is required to make these associations. This provides a versatile and flexible tool for managing complex communications services.

Figure 3:
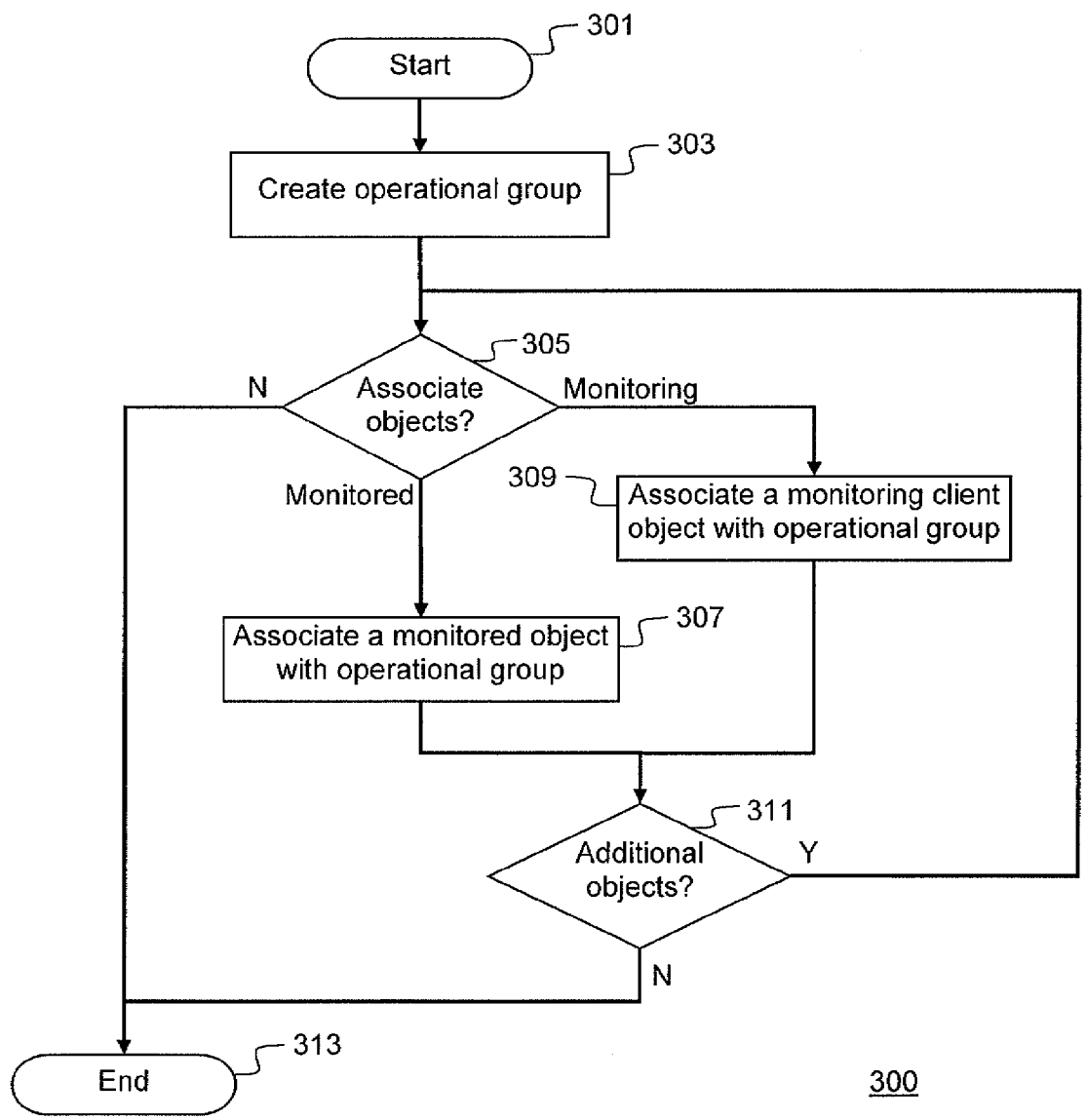
FIG. 3 illustrates a process flow diagram according to an embodiment of the present invention.

FIG. 3 illustrates a flow diagram of process 300 according to an embodiment of the present invention. This method is performed at a network element of a communication network. The method starts at step 301. At step 303, an operational group object is created. The operational group is assigned an identifying label.

Step 305 determines if and what type of object is to be associated with the operational group. If no object is to be associated with the operational group, the process ends at step 313. Operational groups can be created without associations. Objects can be associated with the operational group at a later time.

If step 305 determines that a monitored object is to be associated, then at step 307 a monitored object is associated with the operational group, so that the operational status of the operational group is a function of the operational status of one or more monitored objects. The process then proceeds to step 311 which determines if additional objects should be associated with the operational group and if so, the method returns to step 305. If no additional objects are to be associated then the process ends at step 313.

If step 305 determines that a monitoring object is to be associated, then at step 309 a client object (or service) is associated as a monitoring client object with the operational group so that the operational status of the client object is a function of the operational status of the operational group. The process then proceeds to step 311 described above.

An exemplary command line sequence is now presented for the case of a simple configuration in which a BGP VPLS mesh used to interconnect different customer locations. The following configuration steps apply to a customer edge (CE) device which is dual-homed to two PEs using BGP MH:

service>oper-group vpls-mesh-1 create
service>vpls>bgp>pw-template-binding>oper-group vpls-mesh-1
service>vpls>site>monitor-group vpls-mesh-1

The first command creates the operational group "vpls-mesh-1". The operational group is a virtual group which is used to associate monitored objects and monitoring client objects.

The second command associates an existing BGP VPLS service "pw-template-binding" with the operational group "vpls-mesh-1" such that the operational status of "vpls-mesh-1" is a function of the operational status of "pw-template-binding".

The third command associates an existing VPLS service "site" as a monitoring client object for operational group "vpls-mesh-1" such that the operational status of "site" reflects the operational status of "vpls-mesh-1".

The same command line principles can apply for the case of a Backbone VPLS used in the PE-GW and PE-C to implement a PBB-VPLS solution across the MAN and WAN interconnection. See IETF definition for PBB-VPLS model at http://datatracker.ietf.org/doc/draft-ietf-l2vpn-pbb-vpls-pe-model/.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Numerous modifications, variations and adaptations may be made to the embodiment of the invention described above without departing from the scope of the invention, which is defined in the claims.

What is claimed is:

1. A network element comprising a processor configured for:
   creating an operational group object associating with one or more monitored objects;
   determining a status parameter for each of the one or more monitored objects which are monitored using corresponding one or more monitoring objects, wherein an operational status of said operational group object is a function of the status parameter of each of said one or more monitored objects; and
   associating said one or more monitoring objects with said operational group object, wherein an operating status of said one or more monitoring objects is a function of said operational status of said operational group object, such that if the operation status of the operational group object goes down, the operating status of the one or more monitoring objects goes down;
   wherein the operating status of the operational group object goes down only if the operation status of the operational group object goes down and stays at that level for a predefined period of time.

2. The network element of claim 1, wherein said status parameters of the one or more monitored objects are selected from the group comprising: an operational state; a traffic load level; a traffic quality measure; a bit error rate; a quality of service; and a forwarding status.

3. The network element of claim 1, wherein each monitored object of the one or more monitored objects comprises a service selected from the group comprising: a Virtual Leased Line (VLL); a Virtual Private LAN Service (VPLS); a Virtual Private Routed Network (VPRN); and a Circuit Emulation Service.

4. The network element of claim 1, wherein said function is selected from the group of: a threshold of the quantity of monitored objects; a threshold of the quantity of monitored objects having a specific state; and a ratio of the quantity of monitored objects having a specific state relative to the quantity of monitored objects having a different state.

5. The network element of claim 1, wherein said operational group object requires no hierarchical relationship to any monitored object or monitoring object.

6. The network element of claim 1, wherein the operating status of the operational group object goes down only if the status parameters of all or of a predefined number of one or more monitored objects goes down.

7. The network element of claim 1, wherein the operating status of the operational group object goes down only if the status parameters of a predefined percentage of one or more monitored objects goes below a threshold.

8. The network element of claim 1, wherein said operational group object is associated with an application.

9. A method for monitoring a group of network objects, the method comprising:
- creating an operational group object associating with one or more monitored objects;
- determining a status parameter for each of the one or more monitored objects which are monitored using corresponding one or more monitoring objects, wherein an operational status of said operational group object is a function of the status parameter of each of said one or more monitored objects; and
- associating said one or more monitoring objects with said operational group object, wherein an operating status of said one or more monitoring objects is a function of said operational status of said operational group object, such that if the operation status of the operational group object goes down, the operating status of the one or more monitoring objects goes down;
- wherein the operating status of the operational group object goes down only if the operation status of the operational group object goes down and stays at that level for a predefined period of time.

10. The method of claim 9, wherein said status parameters of the one or more monitored objects are selected from the group comprising: an operational state; a traffic load level; a traffic quality measure; a bit error rate; a quality of service; and a forwarding status.

11. The method of claim 9, wherein each said monitored object comprises a service selected from the group comprising: a Virtual Leased Line (VLL); a Virtual Private LAN Service (VPLS); a Virtual Private Routed Network (VPRN); and a Circuit Emulation Service.

12. The method of claim 9, wherein said function is selected to be one of: a threshold of the quantity of monitored objects, a threshold of the quantity of monitored objects having a specific state and a ratio of the quantity of monitored objects having a specific state relative to the quantity of monitored objects having a different state.

13. The method of claim 9, wherein said operational group object requires no hierarchical relationship to any monitored object or monitoring object.

14. The method of claim 9, wherein said operational group object is associated with an application.

15. The method of claim 9, wherein the operating status of the operational group object goes down only if the status parameters of all or of a predefined number of one or more monitored objects goes down.

16. The method of claim 9, wherein the operating status of the operational group object goes down only if the status parameters of a predefined percentage of one or more monitored objects goes below a threshold.

17. A non-transitory computer readable storage medium tangibly storing computer program instructions capable of being executed by a computer processor, the computer program instructions defining code for:
- creating an operational group object associating with one or more monitored objects;
- determining a status parameter for each of the one or more monitored objects which are monitored using corresponding one or more monitoring objects, wherein an operational status of said operational group object is a function of the status parameter of each of said one or more monitored objects; and
- associating said one or more monitoring objects with said operational group object, wherein an operating status of said one or more monitoring objects is a function of said operational status of said operational group object, such that if the operation status of the operational group object goes down, the operating status of the one or more monitoring objects goes down;
- wherein the operating status of the operational group object goes down only if the operation status of the operational group object goes down and stays at that level for a predefined period of time.

* * * * *